United States Patent [19]
Xiao et al.

[11] Patent Number: 6,049,209
[45] Date of Patent: Apr. 11, 2000

[54] AXIAL RESOLUTION ENHANCEMENT METHOD FOR RESISTIVITY WELL LOGS WHICH ACCOUNTS FOR LATERAL VARIATIONS IN THE RESISTIVITY OF EARTH FORMATIONS PENETRATED BY A WELLBORE

[75] Inventors: Jiaqi Xiao; David R. Beard, both of Houston; Bill Harold Corley, Conroe; Ingo M. Geldmacher, Houston, all of Tex.

[73] Assignee: Western Atlas International, Inc., Houston, Tex.

[21] Appl. No.: 09/078,875

[22] Filed: May 14, 1998

[51] Int. Cl.$^7$ .............................. G01V 3/10; G01V 3/18
[52] U.S. Cl. .......................................... 324/339; 324/323
[58] Field of Search .................................... 324/338, 339, 324/323, 341, 366; 175/40, 50; 367/33, 25, 81; 364/422

[56] References Cited

U.S. PATENT DOCUMENTS

| | | | |
|---|---|---|---|
| 5,452,761 | 9/1995 | Beard et al. | 324/339 |
| 5,511,037 | 4/1996 | Randall et al. | 324/369 |

OTHER PUBLICATIONS

Looyestijn, W.J., *Deconvolution of Petrophysical Logs: Applications and Limitations* SPWLA 23$^{rd}$ Annual Logging Symposium, Jul. 6–9, 1982.

Nelson, R.J., Mitchell, W.K., *Improved Vertical Resolution of Well Logs By Resolution Matching*, SPWLA 31$^{st}$ Annual Logging Symposium, Jun. 24–27, 1990.

Barber, T.D., *Induction Vertical Resolution Enhancement– Physics and Limitations*, SPWLA Twenty–Ninth Annual Logging Symposium, Jun. 5–8, 1988.

Barber, T.D., Rosthal, R.A., *Using a Multiarray Induction Tool To Achieve High–Resolution Logs with Minimum Environment Effects*, SPE 22725, Oct. 1991.

Zhou, Q., Beard, D.,, Tabarovsky, L., *Numerical Focusing of Induction Logging Measurements* 12$^{th}$ Workshop in Electromagnetic Induction in Earth, International Union of Geodesy and Geophysics, Aug. 8–14, 1994, Brest., France.

Beard, D.R., Zhou, Q., Bigelow, E.L., *A New, Fully Digital, Full–Spectrum Induction Device for Determining Accurate Resistivity with Enhanced Diagnostics And Data Integrity Verification*, SPWLA 37$^{th}$ Annual Logging Symposium, Jun. 16–19, 1996.

*Primary Examiner*—Jay Patidar
*Attorney, Agent, or Firm*—Richard A. Fagin

[57] ABSTRACT

A method for enhancing the axial resolution of conductivity well log measurements of in earth formation zones radially distal from a wellbore. The method includes calculating differential axial resolution information present in measurements of the conductivity of a zone radially proximal to the wellbore by low pass filtering the proximal zone measurements so as to have the same axial resolution as the measurements of earth formations radially distal from the wellbore, and subtracting the low pass filtered measurements from the measurements of the proximal zone. The differential axial resolution information is projected to conductivity values which would obtain if the proximal zone conductivity were equal to the distal zone conductivity. The projection is calculated by determining a projection factor, which is related to a weighted average of a ratio of conductivity in the distal zone with respect to the conductivity in the proximal zone. The projected differential axial resolution information is then added to the conductivity measurements of the distal zone to obtain higher resolution measurements of conductivity in the radially distal zone.

7 Claims, 3 Drawing Sheets

AXIAL RESOLUTION ENHANCEMENT METHOD FOR RESISTIVITY WELL LOGS WHICH ACCOUNTS FOR LATERAL VARIATIONS IN THE RESISTIVITY OF EARTH FORMATIONS PENETRATED BY A WELLBORE

BACKGROUND OF THE INVENTION

1. Field of the Invention

The invention is related to the field of electrical resistivity well logging of wellbores drilled through earth formations. More specifically, the invention is related to methods for enhancing the axial resolution of resistivity measurements which have relatively great lateral depth of investigation into the earth formations.

2. Description of the Related Art

Electrical resistivity well logging is used for determining certain properties of earth formations penetrated by wellbores. A typical electrical resistivity measuring instrument is an electromagnetic induction "array" well logging instrument such as described in U.S. Pat. No. 5,452,761 issued to Beard et al. The induction logging instrument described in the Beard et al '761 patent includes a number of receiver coils spaced at various axial distances from a transmitter coil. Alternating current is passed through the transmitter coil, which induces alternating electromagnetic fields in the earth formations. Voltages are induced in the receiver coils as a result of electromagnetic induction phenomena related to the alternating electromagnetic fields. Generally speaking, voltages induced in the axially more distal receiver coils are the result of electromagnetic induction phenomena occurring at greater lateral distances from the axis of the instrument, and the voltages induced in the axially proximal receiver coils are the result of induction phenomena laterally more proximal to the instrument axis. Conversely, the axial sensitivity to the electromagnetic phenomena of the measurements made by the axially proximal receiver coils is finer than the axial sensitivity of the measurements made by the axially more distal receiver coils.

An objective of resistivity well logging is to be able to determine the resistivity of the earth formation at relatively great lateral distances from the instrument axis, where it is less likely that the native fluids in the pore spaces of the formations have been disturbed by infiltration of fluid from the wellbore. This objective, however, is in direct conflict with another objective of resistivity well logging which is to determine resistivity with the greatest practical axial resolution, because many earth formations include thin layers having widely different resistivities. The conflict in these objectives results from the previously described relationship between the spacing of the receiver coils from the transmitter coil and the sensitivity of the receiver signals to the position of the electromagnetic phenomena.

One type of method known in the art for improving the axial resolution of the measurements made by the axially more distal receiver coils is called deconvolution. Generally speaking, deconvolution of resistivity well logs is a process which boosts high spatial frequency components of the measurements made by the axially distal receiver coils. See for example, Looyestijn, W. J., *Deconvolution of Petrophysical Logs: Applications and Limitations,* Paper W, 23rd Annual Well Logging Symposium, Society of Professional Well Log Analysts (1982). Deconvolution has proven to be unreliable because the processes typically amplify noise in the measurements, and can be numerically unstable.

Another type of method for improving axial resolution of induction logging measurements is known as "enhanced resolution processing". See for example, Nelson R. J. et al, *Improved Vertical Resolution of Well Logs by Resolution Matching,* Paper JJ, 31st Annual Well Logging Symposium, Society of Professional Well Log Analysts (1990), and Barber, T. et al, *Induction Vertical Resolution Enhancement, Physics and Limitations,* Paper O, 29th Annual Well Logging Symposium, Society of Professional Well Log Analysts (1988). Generally speaking, enhanced resolution processing uses higher spatial frequency measurement components present in measurements made by receiver coils axially proximal to the transmitter coil and adds the higher spatial frequency components to measurements made by the axially more distal receiver coils. Expressed mathematically:

$$C_l^{eh} = C_l + (C_h - C_h^{lpf}) \tag{1}$$

where the enhanced axial resolution measurement is represented by $C_l^{eh}$. The lower and higher axial resolution measurements (those made by the axially proximal and distal receiver coils) are represented, respectively, by $C_l$ and $C_h$, and $C_h^{lpf}$ represents the higher axial resolution measurement after low pass filtering. The low pass filter applied to the higher axial resolution measurement, $C_h$, is selected so that the filtered measurement, $C_h^{lpf}$, has the same axial resolution as the low resolution measurement, $C_l$. The difference quantity in equation (1) therefore represents the higher resolution (higher spatial frequency) information which is absent from the low axial resolution measurements. The filter applied to the higher resolution measurements does not have any effect on the lateral depth of investigation of the measurements, however. The resolution enhancement performed by adding high spatial frequency components from the higher axial resolution measurements to the low axial resolution measurements must necessarily assume that there is substantially no lateral variation in the resistivity of the earth formations. In earth formations of commercial interest, it is typically the case that the resistivity is not laterally constant. Infiltration of fluid from the wellbore to the pore spaces of the formation is the rule rather than the exception, so lateral variations in resistivity can be expected. The enhanced resolution processing methods known in the art do not properly account for this situation.

More recently, induction well logging instruments have been introduced which include a plurality of receivers at various axial distances from a transmitter. The previously described resolution enhancement techniques when applied to these instruments are generalized into so-called "two-dimensional focusing schemes" as described in, Barber, T. A., and Rosthal, R. A., *Using a Multiarray induction Tool to Achieve High-Resolution Logs with Minimum Environmental Effects,* paper no. 22725 presented at the 1991 SPE Annual Technical Conference and Exhibition, Dallas, Tex., or Zhou, Q., Beard. D., and Tabarovsky, L. A., *Numerical Focusing of Induction Logging Measurements,* 12th Workshop in Electromagnetic Induction in Earth, International Union of Geodesy and Geophysics (1994). These two dimensional focusing schemes can be expressed mathematically as:

$$\sigma_{\log}(z) = \sum_{n=1}^{N} \sum_{z'=z_{min}}^{z_{max}} w_n(z') \sigma_a^n(z-z')$$

where N represents the number of measurement channels (receiver coils), $\sigma_{\log}$ represents a focused log with a desired lateral depth of investigation and axial resolution, $\sigma_a^n$ represents an unfocused measurement from the n-th measurement channel (receiver coil), and $w_n$ represents a set of filter coefficients to be applied to the n-th measurement channel (receiver coil). These deconvolution and enhanced resolution techniques are, in fact, special cases of a general 2-dimensional focusing scheme, where N=1 and 2, respectively. It can also be shown that this 2-dimensional focusing scheme is based on the assumption of no lateral variation in the resistivity of the earth formation. None of these resolution enhancement schemes properly accounts for the situation where there is infiltration of fluid from the wellbore into the pore spaces of the earth formations.

SUMMARY OF THE INVENTION

The invention is a method for enhancing the axial resolution of conductivity well log measurements of earth formations radially distal from a wellbore which accounts for lateral variations in conductivity of the earth formations. The method includes calculating differential axial resolution information present in measurements made of the conductivity in radially proximal zone in the earth formation by low pass filtering the proximal zone measurements so as to have the same axial resolution as measurements of conductivity of the radially distal earth formation, and then subtracting the low pass filtered measurements from the conductivity measurements of the proximal zone. The differential axial resolution information is then projected to the values which would obtain if the proximal zone conductivity were equal to the distal zone conductivity. The projection is calculated by using a weighted average of a ratio of conductivity in the distal zone with respect to conductivity in the proximal zone. The projected differential axial resolution information is then added to the conductivity measurements of the radially distal zone. The result is conductivity measurements of the radially distal zone having a higher axial resolution than the unmodified conductivity measurements of the radially distal zone.

In the preferred embodiment of the invention, a spatial filter used for the step of low pass filtering is calculated from a vertical geometric response function of the induction signals used to measure the conductivity in the proximal zone and a vertical geometric response function of the induction signals used to measure the conductivity in the radially distal zone.

DESCRIPTION OF THE PREFERRED EMBODIMENT

Figure 1:
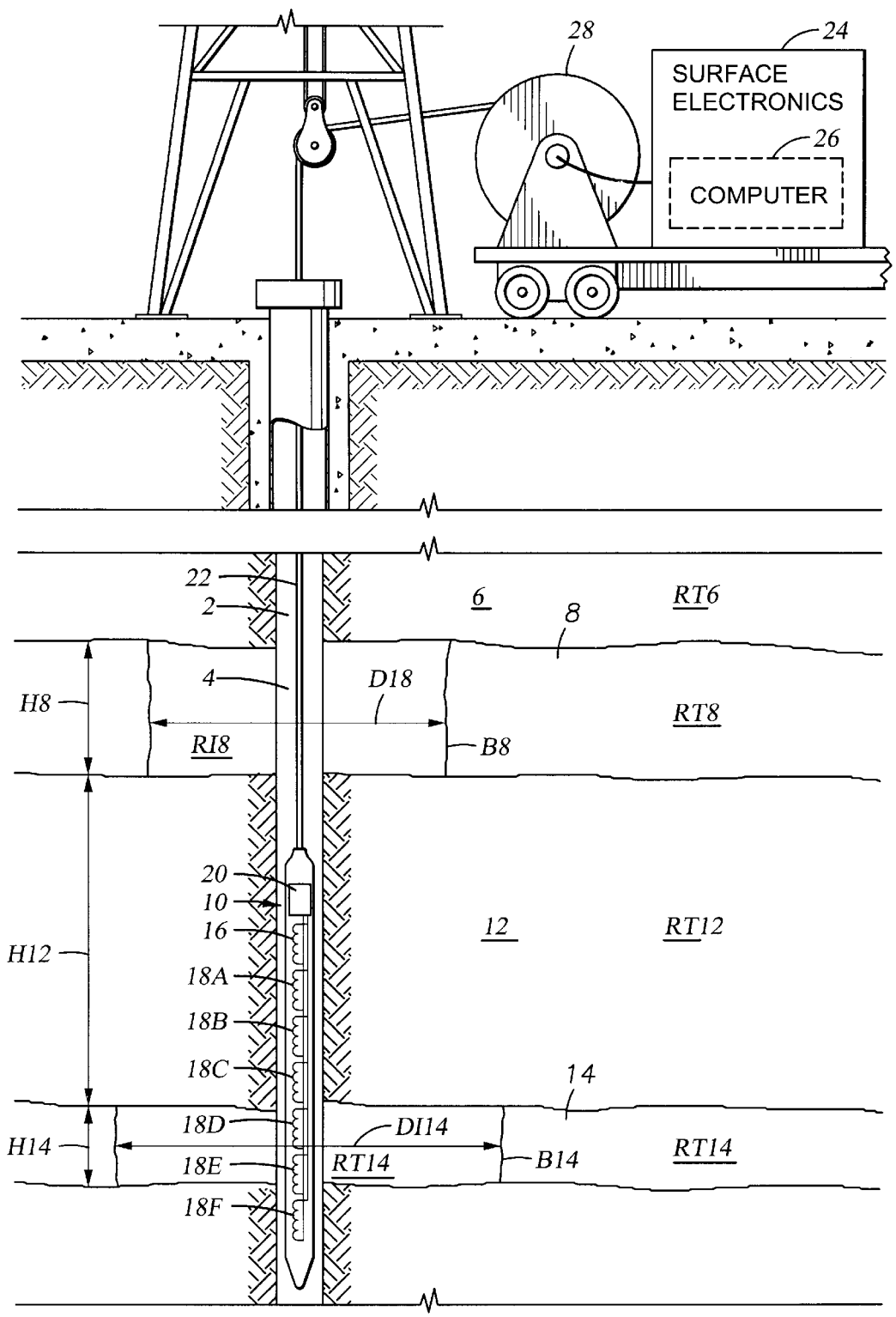
FIG. 1 shows an array-type electromagnetic induction well logging instrument disposed in a wellbore drilled through earth formations.

FIG. 1 shows an electromagnetic induction well logging instrument 10 disposed in a wellbore 2 drilled through earth formations. The earth formations are shown in layers generally at 6, 8, 12 and 14. The well logging instrument 10 is typically lowered into the wellbore 2 at one end of an armored electrical cable 22, by means of a winch 28 or similar spooling device well known in the art. An induction well logging instrument which will generate appropriate electromagnetic induction measurements for performing the process of the invention is described, for example, in U.S. Pat. No. 5,452,761 issued to Beard et al. The logging instrument 10 can include a telemetry/signal processing unit 20 (SPU). The SPU 20 can include a source of alternating current (not shown separately) to be conducted through a transmitter coil 16 disposed on the instrument 10. Receiver coils 18A–18F can be disposed at axially spaced apart locations along the instrument 10. The SPU 20 can include receiver circuits (not shown separately) connected to the receiver coils 18A–18F for detecting voltages induced in each of the receiver coils 18A–18F. The SPU 20 can also impart signals to the cable 22 corresponding to the magnitude of the voltages induced in each of the receiver coils 18A–18F. Signals corresponding to the voltages induced in each receiver coil 18A–18F can be transmitted along the cable 22 to surface electronics 24. The surface electronics 24 can include detectors (not shown) for interpreting the signals from the instrument 10 and a computer 26 to perform, among other data acquisition and processing tasks, the process according to the invention on the signals transmitted form the logging instrument 10.

It is to be understood that the number of receiver coils and the axial spacing of each of the receiver coils 18A–18F with respect to the transmitter coil 16 as shown in FIG. 1 is not meant to limit the invention. It is to be further understood that the receiver coils shown in FIG. 1 can either be single coils or a type of coil known in the art as "mutually balanced" wherein a second coil (not shown) is series connected in inverse polarity to the primary coil (not shown in FIG. 1) so as to reduce the effect of direct induction from the transmitter coil 16. It is only necessary for purposes of this invention that the well logging instrument 10 includes an axially distal receiver coil, such as 18F, which makes measurements having a lateral depth of investigation primarily in zones such as shown at RT6, RT8, RT12 and RT14 in FIG. 1, which are relatively unaffected by fluid infiltration from the wellbore 2 into the pore spaces of the formation. These measurements can be referred to as laterally distal measurements of resistivity (or its inverse, conductivity). The logging instrument 10 should also include a receiver coil such as 18A which is axially proximal to the transmitter coil 16 so that this receiver coil makes measurements having relatively fine axial resolution. These measurements will have a relatively shallow (radially proximal to the wellbore) lateral depth of investigation and can be referred to as laterally proximal measurements of resistivity (conductivity). The radially proximal measurements will be more affected by the resistivity (conductivity) of the earth formation in invaded zones such as shown at RI8 and RI14 in FIG. 1 than are the radially distal measurements.

The invention uses a "projection" technique which takes relatively high axial resolution measurements made by receiver coils axially proximal to the transmitter coil (such as 18A or 18B in FIG. 1, for example) and determines what these measurements would most likely be in a portion of the earth formations which is substantially unaffected by fluid (mud filtrate) infiltration from the wellbore into the pore spaces of the formation, such as regions RT8 and RT14 in FIG. 1. The projection technique of the invention assumes that a property of the earth formation, called the formation factor, F, is substantially constant with respect to lateral distance with respect to the wellbore 2. This assumption is reasonable since the formation factor depends mainly on characteristics of earth formations such as fractional volume of pore space ("porosity"), degree of cementing or mineral bonding between grains of the formation, and the tortuosity of the pore spaces in the formation, all of which are substantially independent of the nature of the fluid actually disposed in the pore spaces of the earth formation. Therefore the formation factor is not likely to be substantially affected by fluid infiltration, even though the resistivity (conductivity) of the formation proximal to the wellbore 2 may be substantially affected by such infiltration.

Assuming that the formation factor, F, remains constant with respect to lateral distance from the wellbore 2, the invention can be explained as follows. In a typical earth formation, the apparent resistivity (conductivity) of a zone laterally proximal to the wellbore 2, such as RI8 for the invaded zone in formation layer 8 (expressed as $\sigma_P$), and its corresponding zone RT8 in the laterally distal portion of the formation (expressed as $\sigma_D$), can be expressed in terms of apparent fluid conductivities in each zone and the formation factor by the expressions:

$$\sigma_P(z) = \frac{\sigma_{wa-P}(z)}{F(z)} \quad (3)$$

$$\sigma_D(z) = \frac{\sigma_{wa-D}(z)}{F(z)} \quad (4)$$

where $\sigma_{wa-P}$ represents the apparent conductivity of the fluid in the pore spaces in the laterally proximal zone, and $\sigma_{wa-D}$ represents the apparent fluid conductivity in the pore spaces in the laterally distal zone. In both equations (3) and (4), all the values are expressed as being related to the axial position, z (depth), along the wellbore 2 to indicate that measurements are made as the logging instrument 10 moves along the wellbore 2. It is conventional in the art of induction logging to process measurements in terms of apparent conductivity, and generating a well log presentation scaled in terms of resistivity.

Measurements made by one of the receiver coils (such as 18A in FIG. 1) which correspond substantially to the proximal zone conductivity, $\sigma_P$, will have an apparent conductivity response, $C_{ah}$, which can be expressed by the equation:

$$C_{ah}(z) = \int g_h(z-z')\sigma_P(z')dz \quad (5)$$

Similarly, measurements made by one of the receiver coils (such as receiver coil 18F in FIG. 1) which correspond primarily to the distal zone conductivity will have a response, $C_{al}$, which can be expressed by the equation:

$$C_{al} = \int g_l(z-z')\sigma_D(z')dz' \quad (6)$$

where $g_h$ and $g_l$ represent, respectively, the axial (vertical) geometric response functions ("VGF") for each of the axially proximal (18A) and axially distal (18F) receiver coils. Selecting the appropriate receiver coil measurements is shown in the process flow chart of FIG. 2 at box 30.

Higher (differential) axial resolution information can be extracted from the axially proximal receiver coil (18A) measurements described in equation (5) by an expression similar to that shown in equation (1):

$$C_{ah}(z) - C_{ah}^{lp} = \int \left(g_h(z-z') - \int g_h(\tau-z')h(z-\tau)d\tau\right)\sigma_P(z')dz' \quad (7)$$

where $h(\tau)$ represents a low pass filter which smooths the higher axial resolution measurement $C_{ah}$ from the axially proximal receiver coil (18A) to have substantially the same axial resolution as the (coarser) lower axial resolution measurement $C_{al}$ from axially distal receiver coil (18F). Low pass filtering and calculating the differential resolution information are shown in boxes 32 and 34 in FIG. 2.

In the invention, the differential axial resolution information calculated in equation (7) is not directly used to adjust the resolution of the axially distal receiver coil (18F) measurements, because the differential axial resolution information is more affected by the conductivity in the laterally proximal zone ($\sigma_P$). A projection factor, $\beta(z)$, can be defined as the ratio of the differential axial resolution information in a radially more proximal zone with respect to the differential axial resolution information in a radially more distal zone. The projection factor can be calculated using an expression such as:

$$\beta(z) = \frac{\int \left(g_h(z-z') - \int g_h(\tau-z')h(z-\tau)d\tau\right)\sigma_P(z')w(z')dz'}{\int (g_h(z-z') - \int g_h(\tau-z')h(z-\tau)d\tau)\sigma_P(z')dz'} \quad (8)$$

w(z) in equation (8) represents the weighted average of the ratio of the conductivity in the radially more distal zone with respect to the conductivity in the radially more proximal zone.

In the case where there is no mud filtrate invasion, w(z) is equal to unity, and therefore $\beta(z)$ will also be equal to unity. Where there is fluid infiltration, as is generally the case in formations of commercial interest, the projection factor can be calculated using the expression:
because the mean value theorem indicates that if w(z) varies slowly over the integral interval, the value $\xi$ falls within the integral interval, therefore the conductivity ratio $$\beta(z) = w(\xi) = \frac{\sigma_D(\xi)}{\sigma_P(\xi)} \quad (9)$$

w(z) can be estimated using relatively coarse axial resolution values for each of the conductivities used to calculate w(z). The relatively coarse axial resolution values can be derived from measurements made from receiver coils such as 18F and 18A. Calculating the projection factor is shown in FIG. 2 at box 36.

A resolution enhanced measurement, $C_{al}^{eh}$, can be calculated as the sum of the differential axial resolution information multiplied by the projection factor, and the lower axial resolution measurement, $C_{al}$. This is shown by the following expression:

$$C_{al}^{eh} = C_{al}(z) + \beta(z)\left[C_{ah}(z) - C_{ah}^{lp}(z)\right] \quad (10)$$

Figure 2:
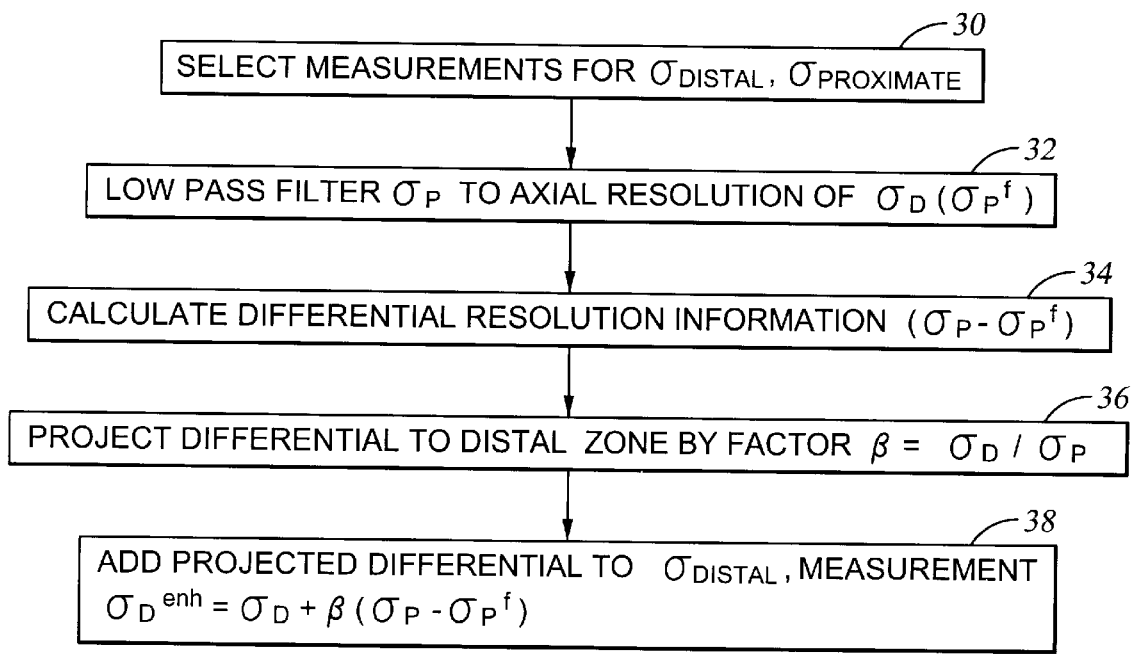
FIG. 2 is a flow chart of the process of the invention.

Calculating the enhanced resolution measurement is shown in FIG. 2 at box 38.

The induction logging instrument shown in FIG. 1 and described in U.S. Pat. No. 5,452,761 issued to Beard et al generates induction voltage signals used to calculate seven apparent conductivity measurements each having a predetermined lateral depth of investigation and axial resolution. These apparent conductivity measurements are referred to as "true resolution focused" measurements. Calculating true resolution focused measurements from the signals generated by the logging instrument described in the Beard et al '761 patent is explained in a paper by Beard, D. R. et al, entitled, *A New Fully Digital, Full-Spectrum Induction Device for Determining Accurate Resistivity With Enhanced Diagnostics and Data Integrity Verification,* Paper B, 37th Annual Well Logging Symposium, Society of Professional Well Log Analysts (1996) and in a paper by, Zhou, Q. et al, *Numerical Focusing of Induction Logging Measurements* 12th Workshop in Electromagnetic Induction in Earth (1994). The axial resolution and lateral depth of investigation for the true resolution focused measurements calculated from the induction signals generated by the logging instrument disclosed in the Beard et al '761 patent are shown in Table 1:

TABLE 1

| Measurement Designation | Lateral Depth of Investigation (inches) | Axial Resolution (feet) |
|---|---|---|
| $C^1_8$ | 8 | 1 |
| $C^2_{10}$ | 10 | 2 |
| $C^3_{20}$ | 20 | 3 |
| $C^4_{30}$ | 30 | 4 |
| $C^6_{60}$ | 60 | 6 |
| $C^8_{90}$ | 90 | 8 |
| $C^{10}_{120}$ | 120 | 10 |

Low pass filters for matching the axial resolution of one of the finer resolution measurements, such as $C^1_8$, to the axial resolution of one of the coarser measurements, such as $C^3_{20}$, can be directly derived from the vertical (axial) geometric response functions, VGF, for the fine resolution curve which is to be matched to a particular coarse resolution curve. For example, a filter which matches the resolution of $C^1_8$ to that of $C^3_{20}$ can be defined as:

$$VGF(C^1_8) = f_8^{1-3} * VGF(C^3_{20}) \quad (11)$$

where the filter designation $f_8^{1-3}$ indicates that the resolution of a measurement having 8 inch lateral depth of investigation and 1 foot axial resolution has been filtered to the same axial resolution as the measurement having 3 foot axial resolution. The symbol "*" in equation (11) denotes convolution. Note that the lateral depth of investigation is unaffected by low pass filtering. Projection factors and enhanced resolution measurements can be calculated using relationships such as shown in equations (7), (8), (9) and (10).

A practical aspect of processing the well log measurements shown in Table 1 includes matching the axial resolution of the radially most distal measurement, $C^{10}_{120}$, to the next most radially distal measurement, $C^8_{90}$, using the resolution enhancement method of the invention to generate an "enhanced" axial resolution measurement having 120 inch lateral depth of investigation and 8 foot axial resolution. This measurement can be referred to as $E^8_{120}$. The enhanced resolution measurement $E^8_{120}$ can then be further enhanced by processing once again according to the method of the invention, this time matching the resolution of the enhanced measurement $E^8_{120}$ to the axial resolution of the next radially distal measurement $C^6_{60}$. This process may be repeated using successively radially more proximal (to the wellbore) measurements until the final desired axial resolution is reached, or until the radially most proximal measurement is used (which for this example is the measurement $C^1_8$). It should be noted that this sequential processing of finer axial resolution measurements provides improved results, but is not necessary to practice the invention. Any radially more distal measurement can be matched to the axial resolution of any radially more proximal measurement using a single process according to the invention. It should also be noted that the radially distal and radially proximal measurements used in this invention can be measurements directly acquired by the well logging instrument (10 in FIG. 1) or can be processed measurements, such as true resolution focused measurements. The process of the invention is equally applicable to either type of measurement.

Figure 3:
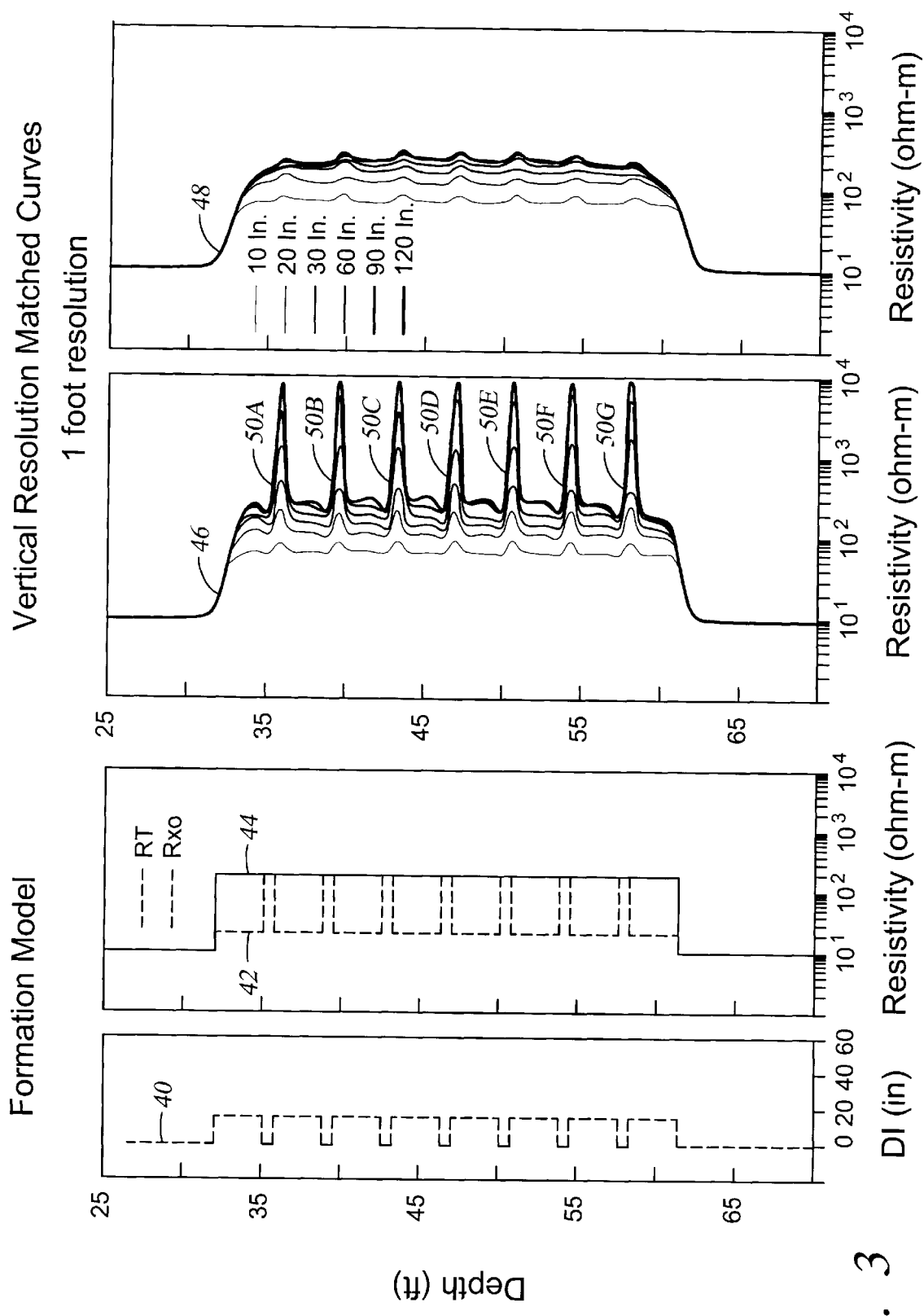
FIG. 3 shows a comparison of resolution enhancement of induction logs using the prior art method with the method of the invention.

A comparison of well logs processed according to the invention with well logs processed according to the resolution enhancement method of the prior art is shown in FIG. 3. A simulated earth formation having invaded zone resistivity shown at curve 42 and uninvaded zone resistivity at curve 44, with lateral depth of the invaded zone extending to a distance shown in curve 40 was used to generate synthetic received signals at each of the plurality of receiver coils on a instrument such as the one described in the Beard et al '761 patent. Using the vertical resolution matching methods of the prior art, the axial resolution of each of the induction measurements was enhanced to a final axial resolution of 1 foot. These curves, for each lateral depth of investigation are shown at 46 in FIG. 3. Resolution enhancement using the method of the invention is shown for the same measurements at 48 in FIG. 3. Artifacts of the prior art method which indicate much higher resistivity than is present in the simulated earth formation appear at 50A through 50G in each case where thin layers having relatively high invaded zone resistivity are present. These artifacts are largely absent from the processed well logs using the method of the invention.

The invention provides a method for enhancing the axial resolution of resistivity well logs which accounts for the fact that formation layers which are of commercial interest likely have different resistivity radially proximal to the wellbore than the resistivity radially distal from the wellbore. This reduces processing artifacts exhibited by the method of the prior art.

Those skilled in the art will devise other embodiments of the invention which do not depart from the spirit of the invention as disclosed herein. Accordingly, the scope of the invention should only be limited by the attached claims.

What is claimed is:

1. A method for enhancing axial resolution of conductivity measurements of an earth formation radially distal from a wellbore drilled therethrough, comprising:

calculating differential axial resolution information present in conductivity measurements of a radially proximal zone in said earth formation by low pass filtering said measurements of said radially proximal zone to an axial resolution of said radially distal measurements and subtracting said low pass filtered measurements from said radially proximal measurements;

projecting said differential axial resolution information to values which would obtain if conductivity in said radially proximal zone were equal to conductivity in said radially distal zone; and adding said projected differential axial resolution information to said conductivity measurements of said radially distal zone.

2. The method as defined in claim 1 wherein said projecting comprises multiplying said radially proximal measurements by a weighted average of a ratio of conductivity in said radially distal zone with respect to conductivity in said radially proximal zone.

3. The method as defined in claim 1 wherein a filter used for said low pass filtering is calculated from a vertical geometric response function of induction signals used to measure said conductivity in said radially proximal zone and a geometric response function of induction signals used to measure said conductivity in said radially distal zone.

4. A method for conductivity well logging, comprising:

measuring electromagnetic induction signals at a plurality of axially spaced apart locations from a transmitter along a logging instrument inserted into a wellbore drilled through said earth formations;

calculating differential axial resolution information present in ones of said induction signals measured proximally to said transmitter by low pass filtering said proximally measured signals to an axial resolution of ones of said signals measured distally from said transmitter, and subtracting said low pass filtered measurements from said proximally measured signals;

projecting said differential axial resolution information to values which would obtain if a formation conductivity corresponding to said proximally measured signals were substantially equal to a formation conductivity corresponding to said distally measured signals; and adding said projected differential axial resolution information to said distally measured signals.

5. The method as defined in claim 4 wherein said projecting comprises multiplying said radially proximal measurements by a weighted average of a ratio of conductivity in said radially distal zone with respect to conductivity in said radially proximal zone.

6. The method as defined in claim 4 wherein a filter used for said low pass filtering is calculated from a vertical geometric response function of induction signals used to measure said conductivity in said radially proximal zone and a geometric response function of induction signals used to measure said conductivity in said radially distal zone.

7. The method as defined in claim 4 further comprising:
 a) calculating differential axial resolution information present in one of said induction signals measured proximally to a most distal one of said spaced apart locations by low pass filtering said proximally measured signals to an axial resolution of one of said signals measured most distally from said transmitter, and subtracting said low pass filtered measurements from said proximally measured signals;
 b) projecting said differential axial resolution information to values which would obtain if a formation conductivity corresponding to said proximally measured signals were substantially equal to a formation conductivity corresponding to said distally measured signals;
 c) adding said projected differential axial resolution information to said distally measured signals;
 d) repeating each of said steps a), b), and c) using measurements made successively axially more proximal to said transmitter until a desired final axial resolution is reached.

* * * * *